United States Patent
Swift

(10) Patent No.: US 12,378,792 B2
(45) Date of Patent: Aug. 5, 2025

(54) REMOVABLE RUBBER COMPOSITIONS AND METHODS OF FORMING REMOVABLE WATERPROOF BARRIERS

(71) Applicant: Swift IP, LLC, Weston, FL (US)

(72) Inventor: Philip Swift, Weston, FL (US)

(73) Assignee: Swift IP, LLC, Weston, FL (US)

( * ) Notice: Subject to any disclaimer, the term of this patent is extended or adjusted under 35 U.S.C. 154(b) by 843 days.

(21) Appl. No.: 17/554,610

(22) Filed: Dec. 17, 2021

(65) Prior Publication Data

US 2023/0167655 A1    Jun. 1, 2023

(51) Int. Cl.
*E04H 9/14*    (2006.01)
*C09D 5/34*    (2006.01)
*C09D 121/00*    (2006.01)
*C09J 121/00*    (2006.01)

(52) U.S. Cl.
CPC ............... *E04H 9/145* (2013.01); *C09D 5/34* (2013.01); *C09D 121/00* (2013.01); *C09J 121/00* (2013.01)

(58) Field of Classification Search
CPC .. E04H 9/14; E04H 9/145; C09D 5/34; C09D 121/00; C09J 121/00
See application file for complete search history.

(56) References Cited

U.S. PATENT DOCUMENTS 4,382,530 A * 5/1983 Calisto .................. B65D 25/48
                                              222/326
5,301,843 A * 4/1994 Groene ............. B05C 17/00516
                                              222/562

(Continued)

FOREIGN PATENT DOCUMENTS

WO      2019217902 A1    11/2019
WO   WO-2023115053 A2 *  6/2023    ......... B05C 17/0052

OTHER PUBLICATIONS

Still shots from the video "How to Prepare for Storms with Flex Seal Family of Products"; YouTube Video; https://www.youtube.com/watch?v=G1LZwsVtKtc; Jun. 15, 2020 (Year: 2020).*

(Continued)

*Primary Examiner* — Ryan D Kwiecinski
(74) *Attorney, Agent, or Firm* — Banner & Witcoff, Ltd.

(57) ABSTRACT

Various forms of rubber compositions may be applied to create a temporary, removable waterproof barrier for various building structures or components such as doors, windows, houses, barns, sheds, mobile homes, automobiles, recreational vehicles, boats, campers, tents, vinyl awnings, covers and tarps, and the like. In some aspects, the form of removable rubber compositions may include a sprayable aerosol-based liquid composition, a viscous liquid rubber composition, a malleable paste or caulk, or a rubberized adhesive tape. In some aspects, the rubber compositions may be applied to portions of a building structure or component which are at risk from water damage due to an approaching storm or natural event, and to create a temporary, watertight barrier that is removable without damaging the building structure or component. The rubber compositions and rubberized tape may be removed from the building structure or component after the storm or natural event has subsided.

20 Claims, 10 Drawing Sheets

(56) References Cited

U.S. PATENT DOCUMENTS

| | | | | |
|---|---|---|---|---|
| 7,735,291 | B2* | 6/2010 | Summy | E06B 1/62 |
| | | | | 52/60 |
| 9,528,005 | B1* | 12/2016 | Miriani | C08K 3/36 |
| 9,586,751 | B1* | 3/2017 | Swift | B65D 83/14 |
| 10,259,008 | B1* | 4/2019 | Swift | B05D 1/02 |
| 10,294,715 | B1* | 5/2019 | Hertel | E06B 9/00 |
| 10,960,830 | B2 | 3/2021 | Swift | |
| 11,060,313 | B2* | 7/2021 | Weiss | E02D 31/00 |
| 11,131,620 | B1* | 9/2021 | Swift | G01N 33/44 |
| 11,840,878 | B2* | 12/2023 | Liebscher | E06B 3/9687 |
| 2005/0011140 | A1* | 1/2005 | Ackerman, Jr. | E06B 1/62 |
| | | | | 52/58 |
| 2005/0102964 | A1* | 5/2005 | Grunst | E04F 21/165 |
| | | | | 52/741.1 |
| 2006/0051558 | A1* | 3/2006 | Sieber | B32B 5/18 |
| | | | | 428/131 |
| 2010/0170186 | A1* | 7/2010 | Hohmann, Jr. | B32B 27/065 |
| | | | | 52/746.1 |
| 2015/0323103 | A1* | 11/2015 | Coscarella | F16L 5/10 |
| | | | | 277/606 |
| 2017/0182512 | A1* | 6/2017 | Swift | B60R 13/08 |
| 2018/0282997 | A1* | 10/2018 | Chen | B32B 27/20 |
| 2019/0017315 | A1* | 1/2019 | Barresi | E04H 9/145 |
| 2019/0217332 | A1* | 7/2019 | Swift | D06B 1/02 |
| 2019/0277024 | A1* | 9/2019 | Preston | E04B 1/6807 |
| 2020/0095742 | A1* | 3/2020 | Sheridan | E02B 3/108 |
| 2020/0164599 | A1* | 5/2020 | Swift | B29C 65/50 |
| 2021/0079667 | A1* | 3/2021 | Baiada | B32B 21/14 |
| 2021/0178429 | A1* | 6/2021 | Swift | B05D 1/02 |
| 2021/0189675 | A1* | 6/2021 | Mitchell | E02B 3/102 |
| 2021/0213893 | A1* | 7/2021 | Swift | D06B 1/14 |
| 2021/0310268 | A1* | 10/2021 | Weiss | E06B 9/02 |
| 2021/0396651 | A1* | 12/2021 | Swift | G01N 19/04 |
| 2022/0325549 | A1* | 10/2022 | Farmer | E04H 9/145 |
| 2023/0167655 | A1* | 6/2023 | Swift | E04H 9/145 |
| | | | | 106/33 |
| 2023/0175280 | A1* | 6/2023 | Riemelmoser | A62C 3/0214 |
| | | | | 160/330 |
| 2023/0191444 | A1* | 6/2023 | Swift | C09D 5/021 |
| | | | | 206/225 |
| 2023/0220643 | A1* | 7/2023 | Beers | E04H 9/145 |
| | | | | 405/111 |
| 2024/0301713 | A1* | 9/2024 | Ramsey | E04H 9/14 |
| 2024/0309669 | A1* | 9/2024 | Fries | E06B 9/02 |

OTHER PUBLICATIONS

"How to Remove Flex Seal Spray from Surfaces"; https://flexsealproducts.com/blogs/how-to/how-to-remove-flex-seal-spray?srsltid=AfmBOoqzih7NBgiY51AohZtRFVLKqiR5Csfxga9IDimdu5wLN63ejxkl (Year: 2024).*

"How to Remove Flex Shot"; https://flexsealproducts.com/blogs/product-resources/how-to-remove-flex-shot#:~:text=You%20can%20remove%20uncured%20Flex,blade%20or%20caulk%20removal%20tool. (Year: 2024).*

"How to Remove Flex Tape"; https://flexsealproducts.com/blogs/how-to/how-to-remove-flex-tape?srsltid=AfmBOoqKBelECa8cxyx6xlg7ItFX8DGjnj3XSpzUUbjsULxSSvr042gN (Year: 2024).*

Jun. 7, 2023—(WO) ISR and WO—App PCT/US2022/081893.

"Waterproofing Kits" 1-3. ARC inc.. Web: <https://arcfirst.net/wp-content/uploads/2021/07/WP1000-PRE-Waterproofing-Kits-Specification-Submittal-Form.pdf>. Apr. 19, 2019; Entire Document.

"How to Remove Weather Stripping Adhesive" 1-4. Metro Moulded Parts Inc. Web: <https://metrommp.com/how-to-remove-weather-stripping-adhesive/>. Mar. 10, 2021; p. 2.

Tapeplanet, Silver Duct Tape, https://www.tapeplanet.com/silver-duct-tape-12-304-8mm-x-60-yard-roll, visited on Apr. 9, 2023.

WOD Contractor Grade Duct Tape 60 yards DTC12 https://taperproviders.com/products/dtc12-pa?variant=43204268130539, visited Apr. 9, 2023.

Stop Leaks Fast With Flex Seal Liquid Rubber in an Aerosol Can!, Chemical Science, www.myflexseal.com, 2011.

Flood Zipper™ Keeps Homes Bone-Dry, GHW Solutions, LLC, 2022.

Flex Seal Spray, www.flexsealproducts.com/product/flex-seal/; captured Oct. 5, 2020 (Year 2020).

Flex Seal Spring Thaw Kit, www.flexsealproducts.com/product/spring-thaw-kit/; captured Sep. 27, 2020 (Year 2020).

* cited by examiner

REMOVABLE RUBBER COMPOSITIONS AND METHODS OF FORMING REMOVABLE WATERPROOF BARRIERS

BACKGROUND

The increased prevalence and severity of tropical storms in the Southeastern United States and various other locations has spawned a need for improved products for protecting dwellings, commercial buildings, vehicles, and other structures from water damage. Aerosol-propelled, liquid, and paste rubber compositions, such as FLEX SEAL®, FLEX TAPE®, and FLEX PASTE® sold by Swift Response LLC, have been used by consumers for waterproofing and repairing household articles. It would be desirable to develop an easy-to-use product that enables property owners or custodians to create a temporary, waterproof or water-resistant barrier that functions to protect structures during the pendency of a storm and which can be easily removed once the storm or flood waters have subsided.

SUMMARY

Aspects of the invention involve applying sprayable, aerosol-based rubber compositions, to articles and solidifying the composition to create a flexible waterproof barrier. The composition may be applied to create a temporary, removable waterproof barrier for a wide variety of building structures and related components such as doors, windows, as well as mobile homes, recreational vehicles, campers, tents, vinyl awnings, covers and tarps, and the like.

Another aspect of the invention involves applying viscous liquid rubber compositions to articles by brushing, rolling, pouring, or dipping, to create a flexible, yet removable, waterproof barrier. The viscous liquid rubber composition may be solidified to create a temporary, removable waterproof barrier for a wide variety of building structure and related components such as doors, windows, garages, as well as mobile homes, recreational vehicles, campers, tents, vinyl awnings, covers and tarps, and the like.

Still other aspects of the invention involve techniques in which a malleable, rubberized paste or caulk is applied and conforms to the shape of an article to create a flexible, waterproof barrier. The paste and caulk may be applied to create a temporary, removable waterproof barrier for a wide variety of structures such as doors, windows, mobile homes, recreational vehicles, campers, tents, vinyl awnings, covers and tarps, and the like.

Still other aspects of the invention involve techniques in which a relatively thick, rubberized adhesive tape is applied and conforms to the shape of an article to create a flexible, waterproof barrier. The tape may be applied to create a temporary, removable waterproof barrier for a wide variety of structures such as doors, windows, mobile homes, recreational vehicles, campers, tents, vinyl awnings, covers and tarps, and the like. In some examples, strips of tape may be applied in which the strips of tape overlap. In other examples, the strips of tape do not overlap and a gap may be formed between the strips of tape. In certain examples, creating the waterproof barrier may include filling the gaps formed between the strips of the rubberized adhesive tape with one or more of the viscous liquid rubber composition, the injectable rubber caulk, or the malleable rubber paste, and removing one or more of the viscous liquid rubber composition, the injectable rubber caulk, or the malleable rubber paste after the storm or water has subsided.

Another aspect of the invention involves techniques of storm-proofing or waterproofing a building structure that includes preparing a container or a water holding enclosure surrounding the building structure, placing or building a building structure with a garage within the container or water holding enclosure surrounding the building structure, applying removable rubber compositions such as a sprayable aerosol-based rubberized liquid, a viscous liquid rubber, a thick malleable rubber paste, an injectable rubberized caulk, a rubberized adhesive tape, or combinations thereof onto and into the structure, or a portion thereof, and solidifying the compositions to create a temporary, watertight seal, filling the container or water holding enclosure surrounding the building structure with water, wherein the water partially covers the structure, verifying that an interior of the structure is watertight, draining the water from the container or water holding enclosure surrounding the building structure, removing the solidified rubber compositions from the building structure, and re-verifying that the interior of the structure is watertight.

Another aspect of the invention involves techniques of storm-proofing or waterproofing a building structure in which a removable rubber composition is applied to the building structure or a portion thereof and solidifying the composition to create a temporary, watertight seal. In some examples, the building structure may be positioned within a water holding enclosure. In some examples the building structure will include a garage with a garage door. In yet another example, the building structure will include at least one door. In other examples, the building structure may be selected from the group consisting of a house, a miniature house, a mobile home, a trailer, and an automobile. In some examples, the building structure may not have a roof. In some examples, the building structure may be partially covered with water. In still other examples, the water may be removed or drained from the water holding enclosure to the point in which the building structure is no longer covered in water. The solidified rubber composition may then be removed from the building structure without damaging the building structure or related components, and the building structure may be verified as being watertight or to verify that water infiltration has been limited or minimized. In still other examples, the removable rubber composition may be a sprayable aerosol-based rubberized liquid, a viscous liquid rubber, a thick malleable rubber paste, an injectable rubber caulk, a rubberized adhesive tape, or combinations thereof.

Yet another aspect of the invention involves a method of storm-proofing a house or other building structure by applying a removable rubber composition onto the house or a portion thereof to create a temporary, watertight seal. In some examples, the removable rubber composition may be selected a sprayable aerosol-based rubberized liquid, a viscous liquid rubber, a malleable rubber paste, an injectable rubber caulk, a rubberized adhesive tape, and combinations thereof. In another example, the removable rubber composition is applied from a ground level of the house to a height of at least 3 feet above the ground level. In yet another example, the house may include at least one door, a garage door, and a plurality of windows. In another example, the house may lack a roof. In some examples, every seam of the at least one door, the garage door, and the plurality of windows may be sealed with the rubber composition(s). In still other examples, the house may be positioned within a water holding enclosure surrounding the house, and the strips of the rubberized adhesive tape may be applied end to end such that small gaps are formed between the strips of the rubberized adhesive tape. The gaps may be formed end to end in width of the tape and may also form end to end in length of the tape. In one example, the strips of the rubberized tape may be applied such that the ends overlap with each other. The ends may overlap in width-wise and/or length-wise. The gaps formed between the strips of the rubberized adhesive tape may be filled or covered with one or more of the viscous liquid rubber composition, the injectable rubber caulk, or the malleable rubber paste. In some examples, the method may include flooding the water holding enclosure with water to cover a portion of the house with the water, subsequently draining the water from the water holding enclosure, and removing the rubber composition from the house without damaging the house.

Other aspects of the invention involve techniques of waterproofing a building structure by applying a removable rubber composition onto the building structure or a portion thereof to create a temporary water barrier prior to exposure to storm or flood water. In some examples, the removable rubber composition may be a sprayable aerosol-based rubberized liquid, a viscous liquid rubber, a malleable rubber paste, an injectable rubber caulk, a rubberized adhesive tape, or combinations thereof. In other examples, the removable rubber composition may be applied from a ground level of the building structure to a height of at least 3 feet above the ground level. In another example, the building structure may include at least one door and every seam of the at least one door may be sealed with the rubber composition. In some examples, the strips of the rubberized adhesive tape may be applied end to end such that small gaps are formed between the strips of the rubberized adhesive tape. In yet another example, the gaps formed between the strips may be filled with the rubberized adhesive tape with one or more of the viscous liquid rubber composition, the injectable rubber caulk, or the malleable rubber paste. In still other examples, the rubber composition may be removed from the house without damaging the house after the storm or flood water has subsided.

BRIEF DESCRIPTION OF THE DRAWINGS

A more complete understanding of the present invention and certain advantages thereof may be acquired by referring to the following detailed description in consideration with the accompanying drawings, in which.

DETAILED DESCRIPTION

Figure 1:
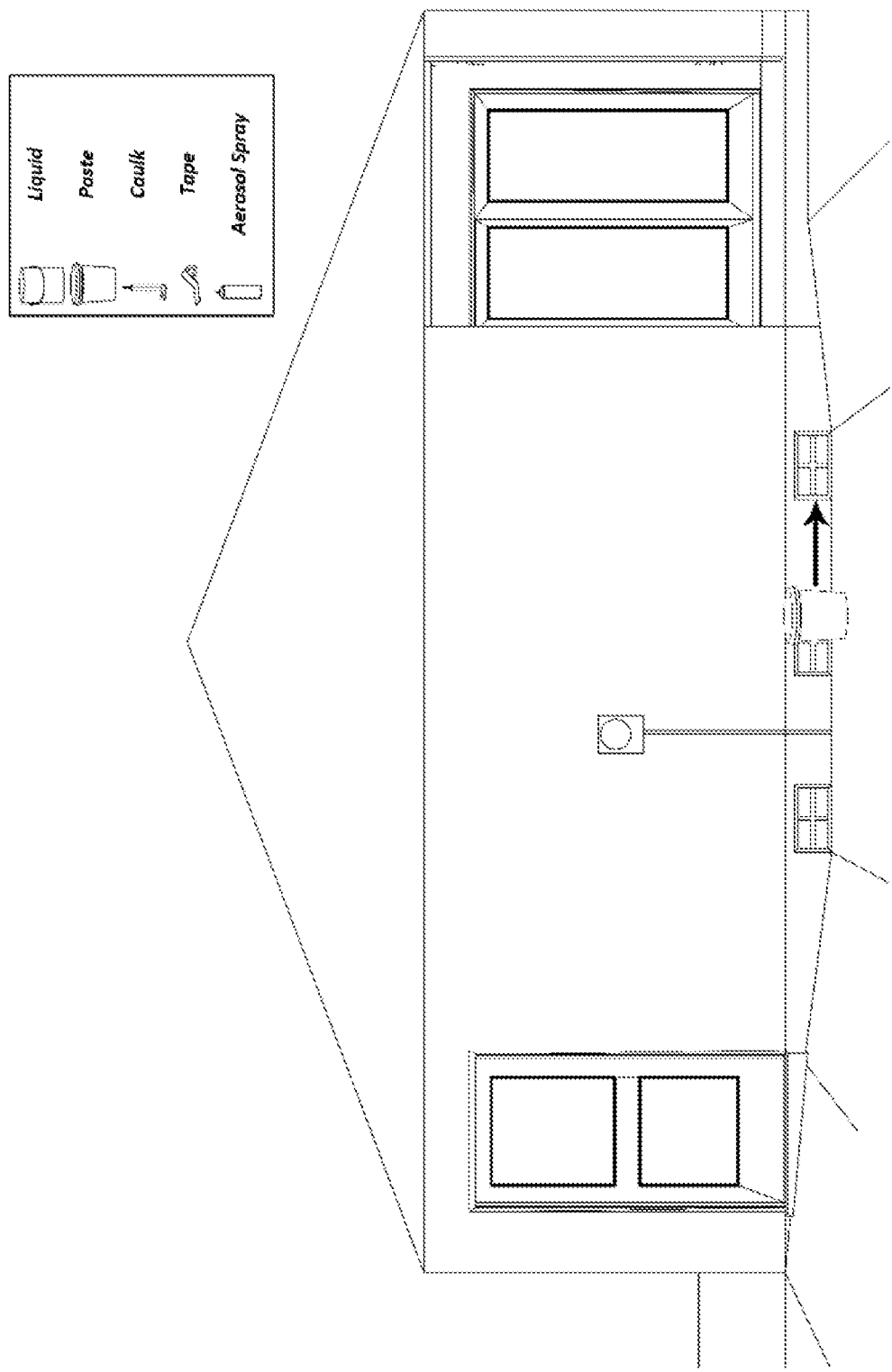
FIG. 1 illustrates application of a removable rubberized paste composition to waterproof a house.

Sprayable, aerosol-based liquid rubber compositions (sometimes referred to herein simply as "compositions") may be used to form a temporary, removable waterproof barrier for a wide variety of structures such as doors, windows, mobile homes, recreational vehicles, campers, tents, vinyl awnings, covers and tarps, and the like.

"Compositions" may also refer to viscous liquid rubber compositions, or malleable, rubberized pastes and caulks that may be may be used to form a temporary, removable waterproof barrier for a wide variety of structures such as doors, windows, mobile homes, recreational vehicles, campers, tents, vinyl awnings, covers and tarps, and the like. Composition may also be used interchangeably with "tape" herein. The compositions may be designed to help slow down, restrict, or stop flood and storm waters from entering homes, businesses, municipality or other types of building structures. A building structure may include a house, a house with a garage, a motor home, a trailer, a shed, an apartment, a condominium, a townhome, barndominium, an office building, a residential building, a retail building, multipurpose building, a school, a university building, a church, an airport, an airport terminal or other transportation terminal, a religious building, or other dwelling. The compositions disclosed herein may be water-resistant (i.e., capable of resisting the penetration of water to some degree but not entirely); water-repellent (i.e., not easily penetrated by water); and/or waterproof (i.e., impervious to water). The terms waterproof, water-resistant, and water-repellent may be used interchangeably herein. The compositions disclosed herein may also create a structure or component that is substantially water-tight, limiting the amount of water that penetrates a structure or component. For example, the water that penetrates a building structure or component thereof may be limited to at least, greater than, less than, equal to, or any number in between about 0, 1, 2, 3, 4, 5, 6, 7, 8, 9, 10, 11, 12, 13, 14, 15, 16, 17, 18, 19, 20, 21, 22, 23, 24, 25, 30, 35, 40, 45, and 50 gallons of water.

In some examples, compositions may also be applied to articles for purposes of waterproofing, or modifying an article to make it waterproof by covering preformed holes, or openings or by adding a moisture-impermeable layer to the article or portion thereof. The compositions may include one or more synthetic rubber components and generally may be formulated to be sprayable by inclusion of an aerosol propellant. The compositions may be sprayed, poured, or spread into cracks in concrete, such as cracks present along a garage floor or in a basement foundation. The compositions may be sprayed, poured, or spread directly into, on, or within seams, cracks, holes, or gaps in windows, doors, etc. to penetrate into deep hard-to-reach areas and create a waterproof seal. The compositions also may be applied with a paint roller onto doors, windows, garage doors, sliding doors, siding, concrete walls or floors to create a waterproof layer. Alternatively, do to the ease of removal, the rubberized compositions and rubberized tape may be applied to the interiors of building structures or related components as a means to weatherproof and waterproof the structures.

In other examples, a relatively thick, rubberized adhesive tape (sometimes referred to herein simply as "tape") may be used to create a temporary, removable waterproof barrier for building structures and/or various articles such as doors, windows, mobile homes, recreational vehicles, campers, tents, vinyl awnings, covers and tarps, and the like.

The tape may be highly flexible, allowing it to readily conform to the shape of the article to which it is applied. The adhesive layer is capable of forming a strong bond with a variety of surfaces under a variety of conditions. In some examples, the tape may be applied to a surface that is in contact with water, such as in the case where a storm or flooding has already begun. In other examples the tape may be applied to a dry surface. In some examples, the tape may not be applied to a wet surface. In still another example, the tape must be applied to a dry surface.

In some examples, a tape is applied to a building structure or an article for purposes of waterproofing, including providing a temporary, removable waterproof barrier, or modifying an article to make it waterproof by covering preformed holes or by adding a moisture-impermeable layer to the article or a portion thereof. The tape generally may provide a durable, breathable, weatherproof barrier that is resistant to rain, snow, sun, wind, air moisture, UV degradation, and natural weathering over a wide temperature range.

The compositions may also include one or more synthetic rubber components and generally may be formulated to be viscous though in the liquid phase at room temperature, or a thick malleable paste or caulk at room temperature. The term "viscous liquid composition" or "paste composition" or "caulk composition" may be used herein to refer to non-aerosol based rubber compositions that have a relatively high viscosity, and/or a high thickness and malleability. For example, when a quantity of the composition is poured into a kitchen strainer or onto a horizontally-oriented window screen, the composition normally remains adhered to the strainer or screen without any dripping. For example, see U.S. Pat. Nos. 10,960,830 and 9,528,005, both incorporated herein by reference in their entirety for all purposes. By way of non-limiting example, viscosity of the liquid composition, for example, may range from about 130 ku to about 170 ku, from about 140 ku to about 160 ku, or from about 150 ku to 155 ku; and specific gravity may range from about 1.2 to 1.4 or from about 1.25 to about 1.35. The compositions disclosed herein may be applied at temperatures from about 32° F. to about 150° F. In some examples, the compositions disclosed herein may be applied to wet structures or objects. In still other examples, the compositions disclosed herein may be applied to structures of objects under or submerged in water.

Non-limiting examples of suitable synthetic rubber components include ethylene propylene diene monomer (EPDM) rubber, ethylene propylene rubber, styrene-butadiene rubber (SBR), rubbers prepared from isoprene (2-methyl-1,3-butadiene), chloroprene (2-chloro-1,3-butadiene), or from isobutylene with a small percentage of isoprene for crosslinking, and polyether-based silane-terminated polymers. The compositions typically include a number of other components, such as mineral fillers, fluid carriers, crosslinking agents, catalysts, and the like in suitable proportions that will be apparent to persons skilled in the art with the aid of no more than routine experimentation. The compositions may contain a solvent that volatilizes after application, although in view of current environmental regulations it generally is desirable to employ solvent-less compositions which may cure, for example, by crosslinking when exposed to the environment.

In other examples, the compositions disclosed herein, to include the sprayable aerosol-based rubberized liquid, a viscous liquid rubber, a thick malleable rubber paste, an injectable rubberized caulk may be formulated to include one or more chemical components to enhance the removability of the components and at room temperature. In yet other examples, the compositions disclosed herein may be formulated to remove one or more chemical components to enhance the removability of the compositions at room temperature. Chemical components may include natural or synthetic polymers, resins, adhesives, oils, etc. A nonlimiting example may include modifying compositions, such as FLEX SEAL®, FLEX SEAL LIQUID®, and FLEX PASTE® sold by Swift Response LLC, to enhance the removability of the compositions after application. In some examples, the formulation of the compositions may be modified to include a decreased amount of adhesive to improve removability characteristics. In some examples, the formulation of the compositions may be modified to include an increased amount of oil or resins to improve removability characteristics. In other examples, the formulation of the compositions may be modified to include a decreased amount of oil or resins to improve removability characteristics. In yet another example, the formulation of the compositions may be modified by changing the ratio of oil to resins to improve removability characteristics.

The composition may be provided in a ready-to-use state, e.g., such that no mixing of components is needed. In some aspects, the compositions may be sprayed directly from a spray applicator which contains the composition in a ready-to-use state, poured from a container or applied with a paint roller, or applied with an appropriate tool such as a caulking gun, trowel or similar device. The tape may be applied manually and cut or torn into strips appropriate for the application.

If desired, the compositions and tape may be formulated in a variety of colors tailored to particular applications. For example, compositions and tape may be clear, white, off-white, black, gray, blue, green, red, almond, brown, silver, yellow, terra cotta, or other suitable or desirable colors. In other examples, the tape adhesive may be clear. In yet other examples, the tape adhesive may be colored. The selection of appropriate pigment(s) or other colorant(s) needed to achieve a desired color will be apparent to persons skilled in the art.

The compositions disclosed herein may also be applied to exterior surfaces of automobiles, motor homes, or other types of motor vehicles such as boats, to form a protective layer. The composition also may be applied to various fabrics such as an umbrella, tent, awning, or the like to provide waterproofing. After flood waters or a storm has subsided, the compositions may be removed from the exterior surfaces.

FIG. 1 illustrates application of a removable rubberized paste composition to waterproof or stormproof an example house. The removable rubberized paste composition may be applied to the house foundation, doors, or windows near the ground level by use of a trowel or similar tool. The removable rubberized paste composition may be liberally applied to molding and window flanges anywhere ground water, flood waters, storm waters, or rain may be able to enter the structure. The removable rubberized paste composition may be used to seal cracks, joints, or the outline of the window, or may be used to cover the entire window unit itself. The removable rubberized paste may also be applied to sliding door seams, including along the sliding door base. After flooding or after water has receded or the storm ends, the removable rubberized paste composition may be removed from the structure. In some examples, the aerosolized rubberized liquid-spray composition or rubberized caulk may be used as a secondary layer to seal any potential gaps not covered by the initial coating of the paste composition.

Figure 2:
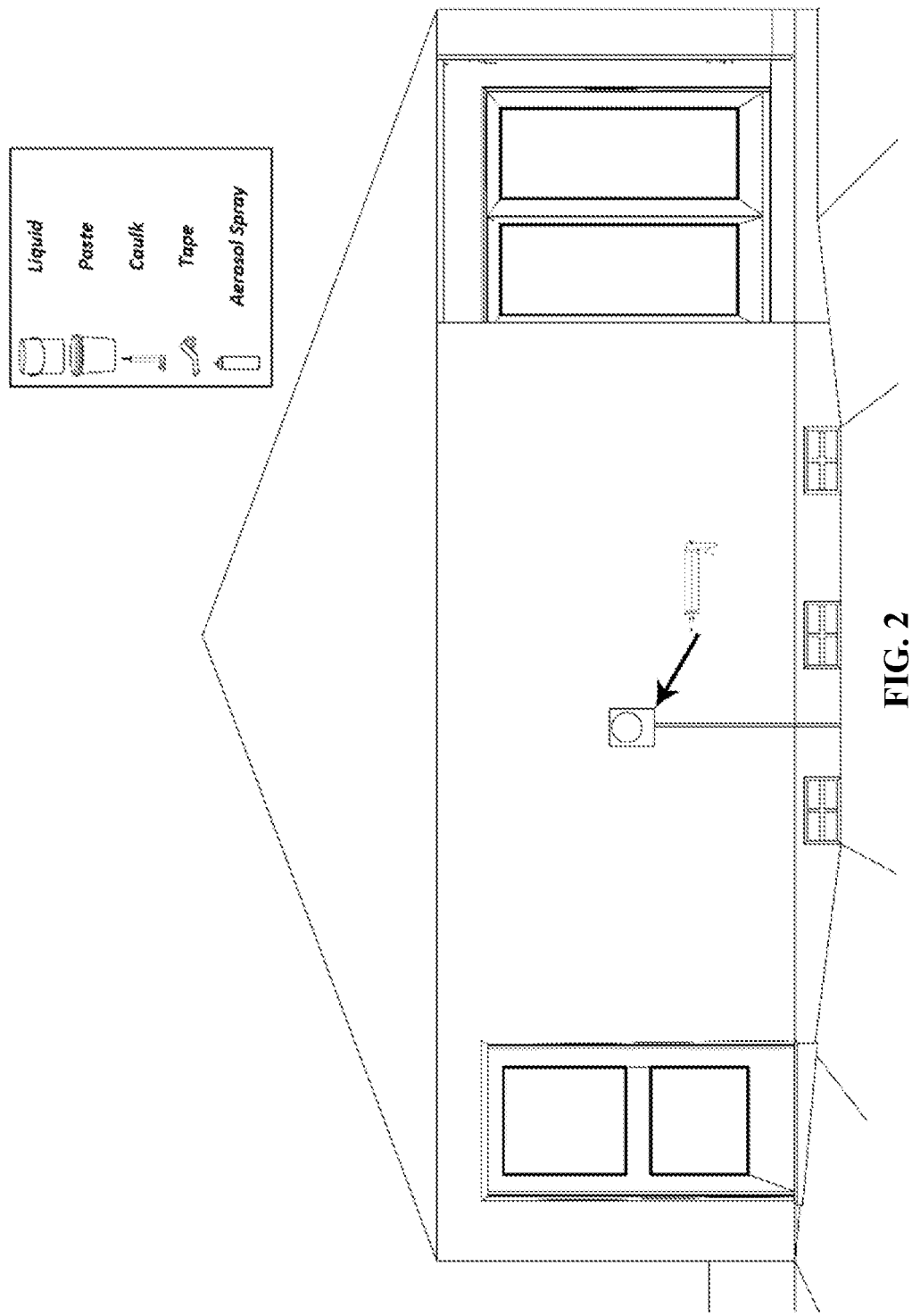
FIG. 2 illustrates application of a removable rubberized caulk composition to waterproof the house of FIG. 1.

FIG. 2 illustrates application of a removable rubberized caulk composition to waterproof or stormproof the example house shown in FIG. 1 and various structures or components of the house. For example, the removable rubberized caulk composition may be applied using a caulking gun around electrical boxes or other wall penetrations with a gap of less than 0.75 inches. The removable rubberized caulk composition may be smoothed with a putty knife or similar tool if necessary. The removable rubberized caulk composition may also be applied to the window joints or gaps, as well as doors, shutters, electrical components, cable equipment, gas lines and meters, sewage lines and pipes, and irrigation devices. After flooding or after water has receded or the storm ends, the removable rubberized paste composition may be removed from the house or other structure. The removable rubberized caulk composition may be used to augment the rubberized paste or to fill cracks or joints not adequately covered by the paste. In some examples, the aerosolized rubberized liquid-spray composition may be used as a secondary layer to seal any potential gaps not covered by the initial coating of the caulk composition.

Figure 3:
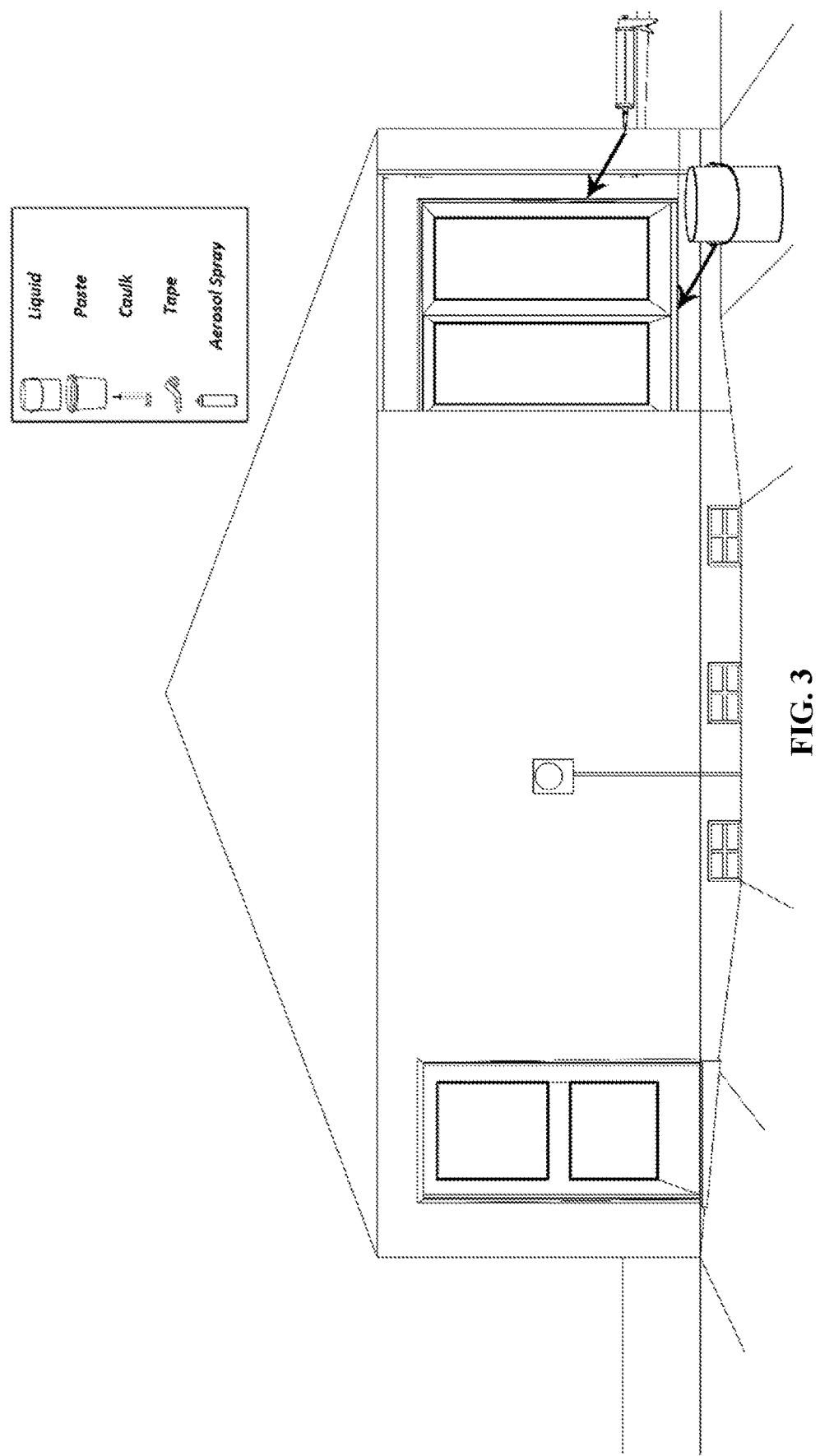
FIG. 3 illustrates application of a removable rubberized liquid composition and a removable rubberized caulk composition to waterproof the house of FIG. 1.

FIG. 3 illustrates application of a removable rubberized liquid composition and a removable rubberized caulk composition by caulking gun to waterproof the example house shown in FIG. 1 or other structure. Sliding door seams, door seams, and window seams may also be waterproofed using the removable rubberized liquid composition disclosed herein. The rubberized compositions disclosed herein may be used to seal window head jambs, brickmoulds, stiles, blind stops, interior stops, side jambs, muntins, sills, aprons, stool, inner sash, meeting rails, parting strips, outer sash, rails, interior casings, etc. The removable rubberized liquid composition may be poured into a sliding glass door track, base and seams, to cover at least about 0.75 inches of the door itself. In other examples, the removable rubberized liquid composition may be poured into a sliding glass door track, base and seams, to cover at least about 0.05, 0.10, 0.15, 0.20, 0.25, 0.30, 0.35, 0.40, 0.45, 0.50, 0.60, 0.65, or 0.70 inches of the door itself. The removable rubberized paste and caulk compositions may be used to augment the liquid composition or to fill cracks or joints not adequately covered by the liquid composition. After flooding or after water has receded or the storm ends, the removable rubberized liquid, paste, and caulk compositions may be removed from the house or structure.

Figure 4:
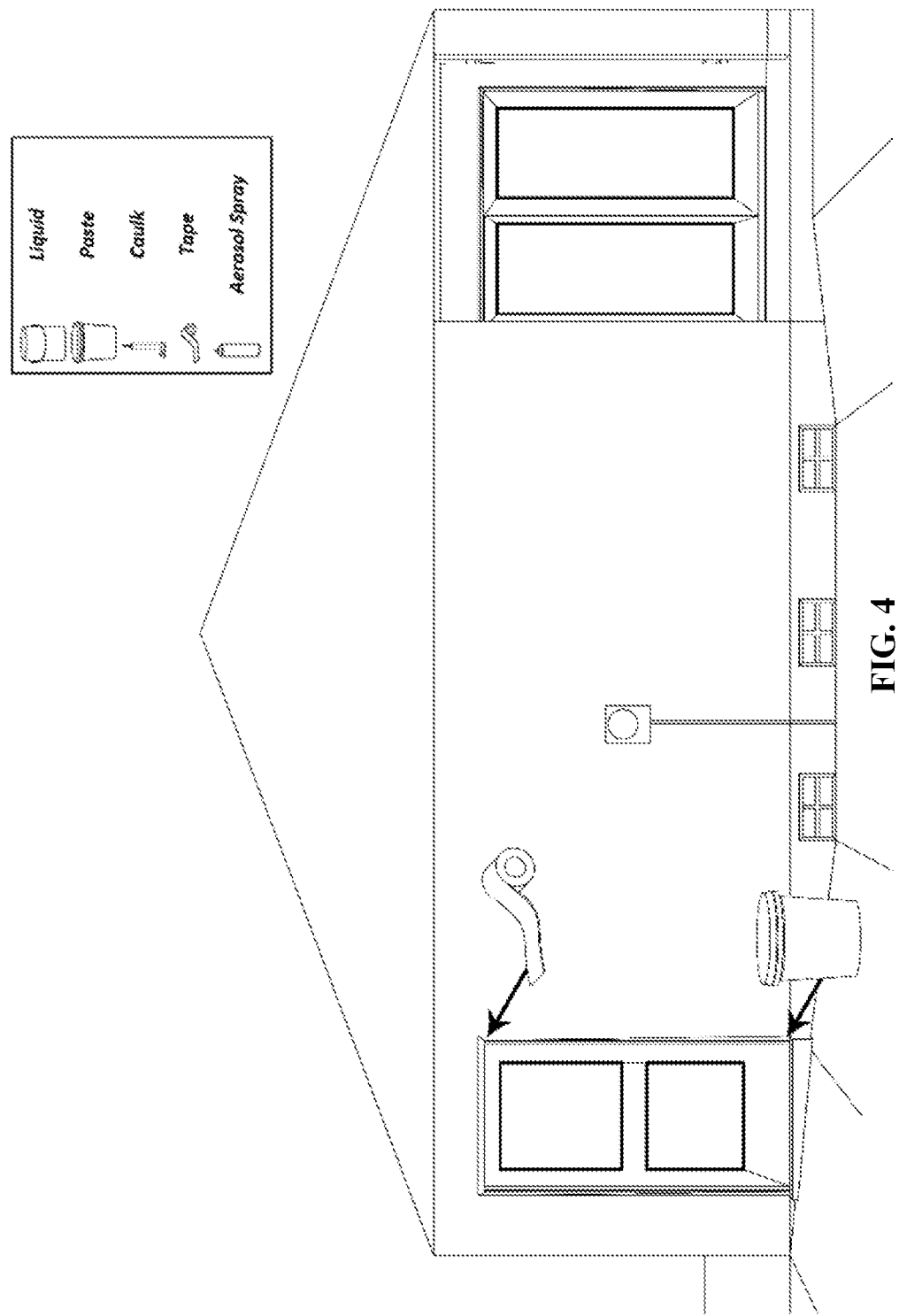
FIG. 4 illustrates application of a removable rubberized paste composition and a removable rubberized tape to waterproof the house of FIG. 1.

FIG. 4 illustrates application of the removable rubberized paste composition and a removable rubberized tape disclosed herein to waterproof the example house shown in FIG. 1. As discussed above, the removable rubberized paste composition may be applied to a door, sliding doors, or windows near the ground level by use of a trowel or similar tool. The removable rubberized paste composition may be liberally applied to the base of doors, door jams, the base of sliding doors, molding and window flanges, and anywhere ground water, flood waters, storm waters, or rain may be able to enter the house or structure. Similarly, the removable rubberized tape may be used to seal the outline of the doors, the outer edges/outline of sliding doors, windows, outer edges of the windows, and anywhere ground water, flood waters, storm waters, or rain may be able to enter the house or structure. In some examples, the aerosolized rubberized liquid-spray composition may be used as a secondary layer to seal any potential gaps not covered by the initial coating of the paste and tape compositions. Again, after flooding or after water has receded or the storm ends, the removable rubberized paste composition and rubberized tape may be removed from the structure.

Figure 5:
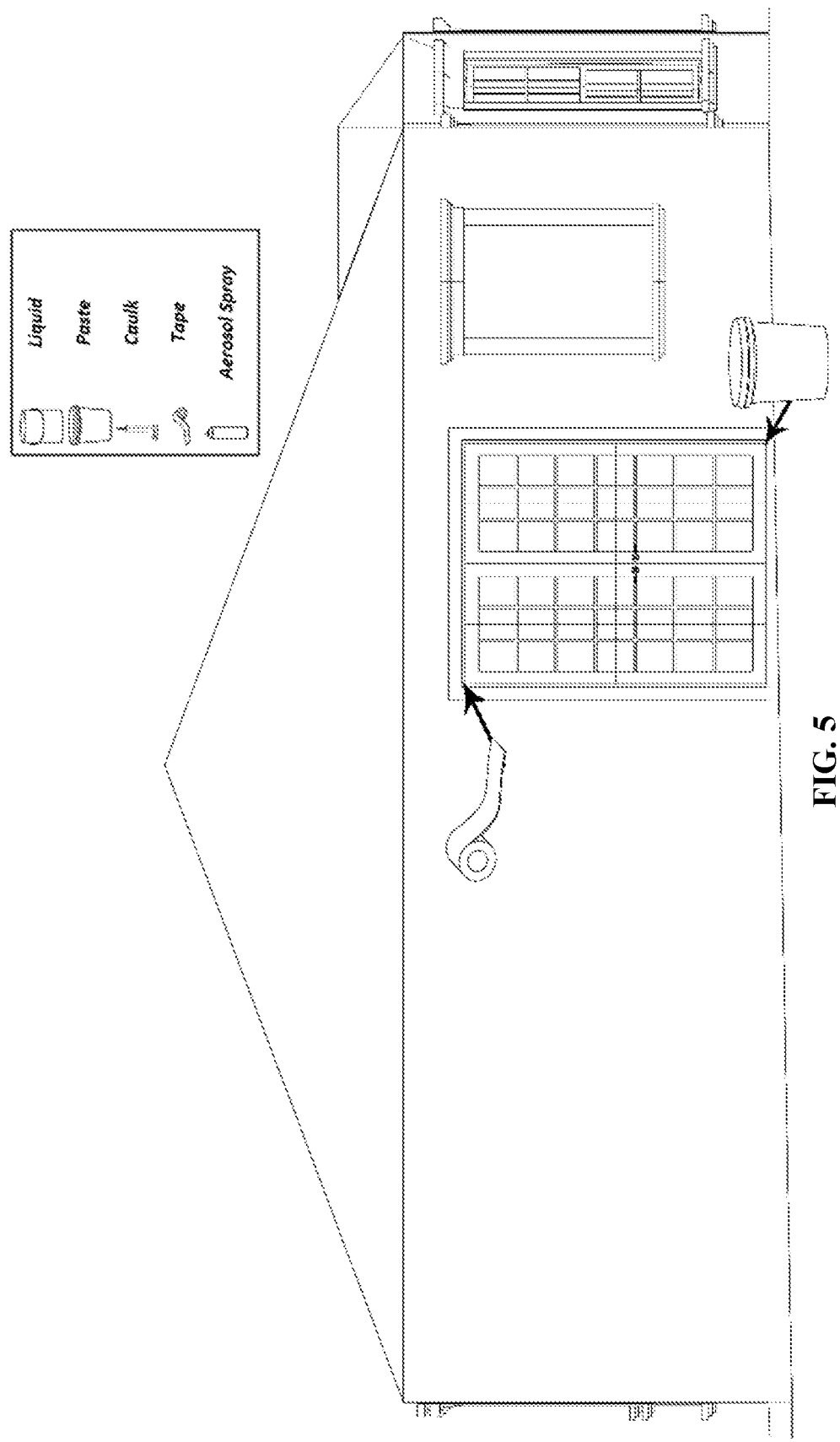
FIG. 5 illustrates application of a removable rubberized paste composition and a removable rubberized tape to waterproof another portion of the house of FIG. 1.

FIG. 5 illustrates application of a removable rubberized paste composition and a removable rubberized tape to waterproof sliding doors of an example structure or house. The removable rubberized paste composition may be applied to a sliding glass door track, base, sliding door seams, door seams, and window seams by use of a trowel or similar tool. The removable rubberized tape may be used to augment the paste composition or to fill cracks, seams, or joints around the sliding door(s) not adequately covered by the paste composition or at the top of the sliding doors. In some examples, the aerosolized rubberized liquid-spray composition may be used as a secondary layer to seal any potential gaps not covered by the initial coating of the paste and tape compositions. After flooding or after water has receded or the storm ends, the removable rubberized paste and tape compositions may be removed from the house or structure.

Figure 6:
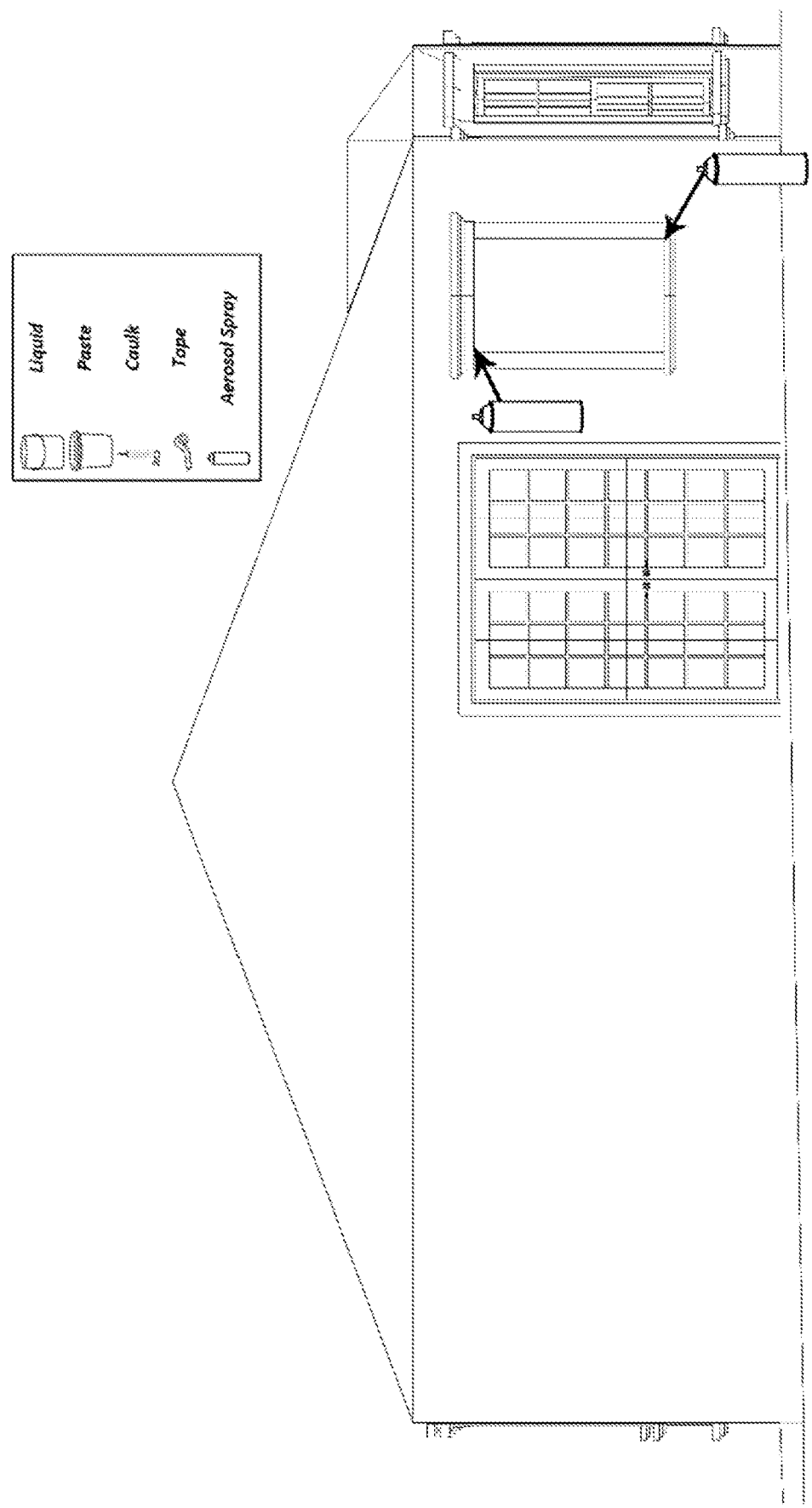
FIG. 6 illustrates application of a removable aerosolized rubberized liquid-spray composition to waterproof the house of FIG. 5.

FIG. 6 illustrates application of an aerosolized rubberized liquid-spray composition to waterproof the house or structure shown in FIG. 5. The aerosolized rubberized liquid-spray composition may be sprayed on window frames, head jambs, brickmoulds, stiles, blind stops, interior stops, side jambs, muntins, sills, aprons, stool, inner sash, meeting rails, parting strips, outer sash, rails, interior casings, and window screens. The removable aerosolized rubberized liquid-spray composition may be used to augment the removable rubberized liquid, paste, and caulk compositions or to fill cracks, seams, or joints not adequately covered by the liquid, paste, caulk, or tape compositions. After flooding or after water has receded or the storm ends, the removable aerosolized rubberized liquid-spray composition may be removed from the house or structure.

Figure 7:
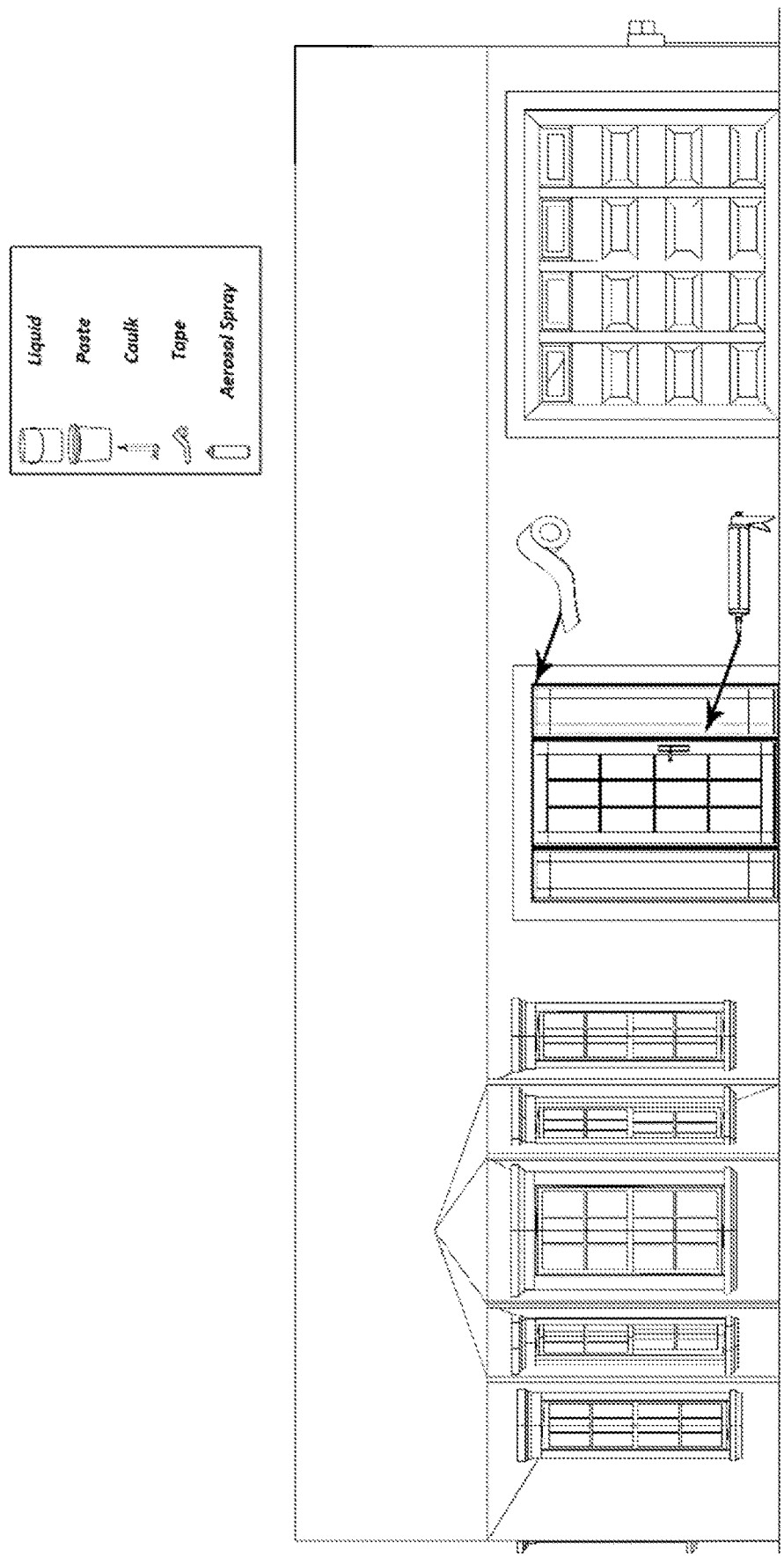
FIG. 7 illustrates application of a removable rubberized caulk composition and a removable rubberized tape to waterproof a different portion of the house of FIG. 1.

FIG. 7 illustrates application of a removable rubberized caulk composition by caulking gun and a removable rubberized tape to waterproof a house or other structure, including windows, doors, shutters, and garage doors. For example, the removable rubberized caulk composition may be applied using a caulking gun around window frames, head jambs, brickmoulds, stiles, blind stops, interior stops, side jambs, muntins, sills, aprons, stool, inner sash, meeting rails, parting strips, outer sash, rails, interior casings, door seams, shutters, garage doors, garage door seams, or other structures with penetrations with a gap of less than about 0.75 inches. In other examples, the removable rubberized caulk composition may be poured into structures having at least about 0.05, 0.10, 0.15, 0.20, 0.25, 0.30, 0.35, 0.40, 0.45, 0.50, 0.60, 0.65, 0.70, or 0.75 inch gaps. The removable rubberized caulk composition may be smoothed with a putty knife or similar tool if necessary. The removable rubberized tape may be used to augment the caulk composition or to fill cracks, seams, or joints around the door frames, window frames, and garage door not adequately covered by the caulk composition or at the top of the structure doors and garage doors. After flooding or after water has receded or the storm ends, the removable rubberized caulk composition and tape may be removed from the house or other structure. The removable rubberized paste and liquid compositions, as well as the aerosolized rubberized liquid-spray composition may be used to augment the rubberized caulk or to fill cracks or joints not adequately covered by the caulk and tape.

Figure 8:
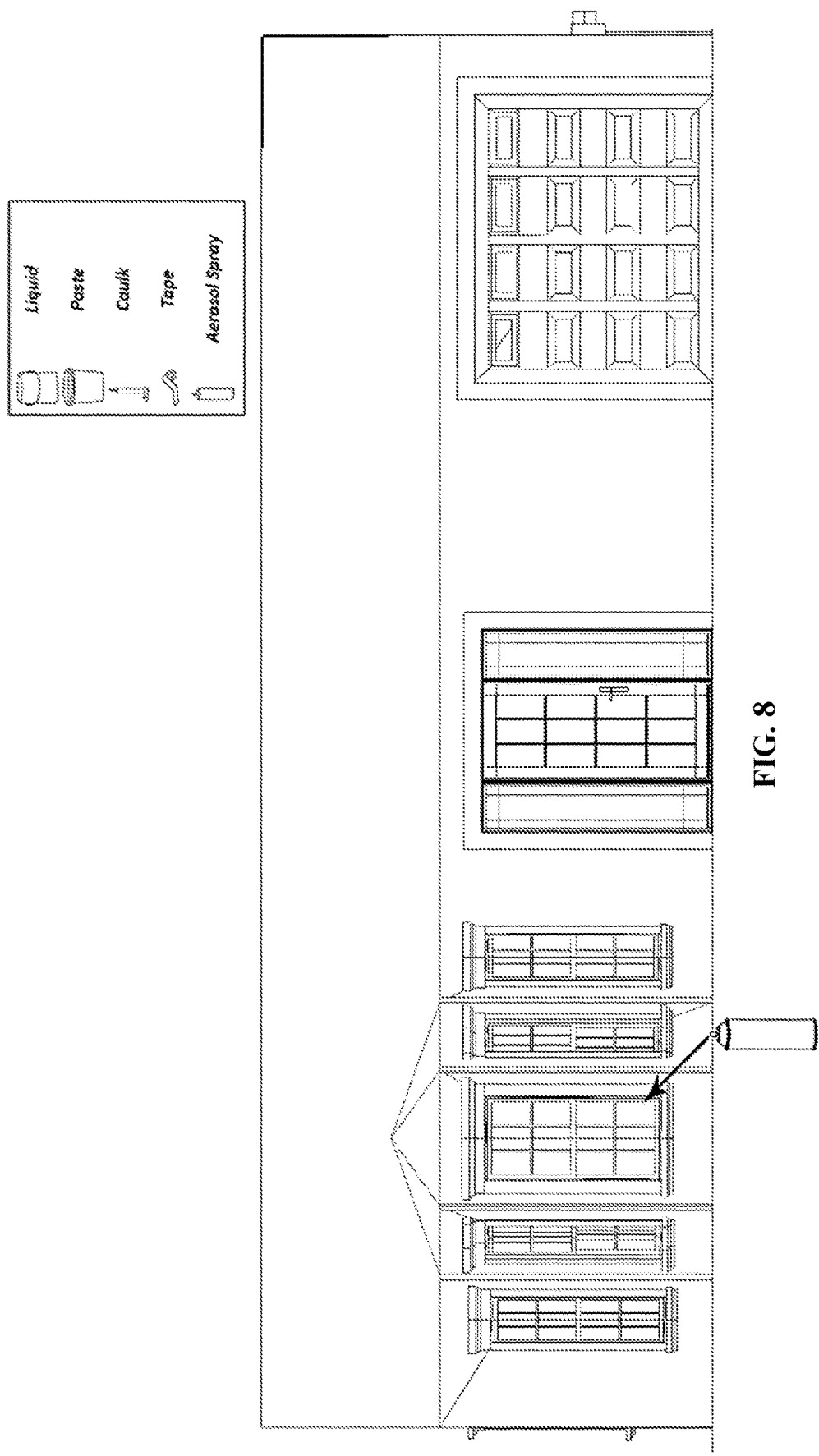
FIG. 8 illustrates application of a removable aerosolized rubberized liquid-spray composition to waterproof the house of FIG. 7.

FIG. 8 illustrates application of a removable aerosolized rubberized liquid-spray composition to waterproof the example house or other structure shown in FIG. 7, including windows, doors, shutters, and garage doors. For example, the aerosolized rubberized liquid-spray composition may be sprayed around window frames, screens, head jambs, brickmoulds, stiles, blind stops, interior stops, side jambs, muntins, sills, aprons, stool, inner sash, meeting rails, parting strips, outer sash, rails, interior casings, door seams, shutters, garage doors, garage door seams, or other structures. The removable rubberized liquid, paste, caulk, and tape may be used to augment the aerosolized rubberized liquid-spray composition or to fill cracks, seams, or joints around the door frames, window frames, and garage door not adequately covered by the aerosolized rubberized liquid-spray composition or at the top of the structure doors and garage doors. After flooding or after water has receded or the storm ends, the hardened aerosolized rubberized liquid-spray composition may be removed from the house or other structure.

Figure 9:
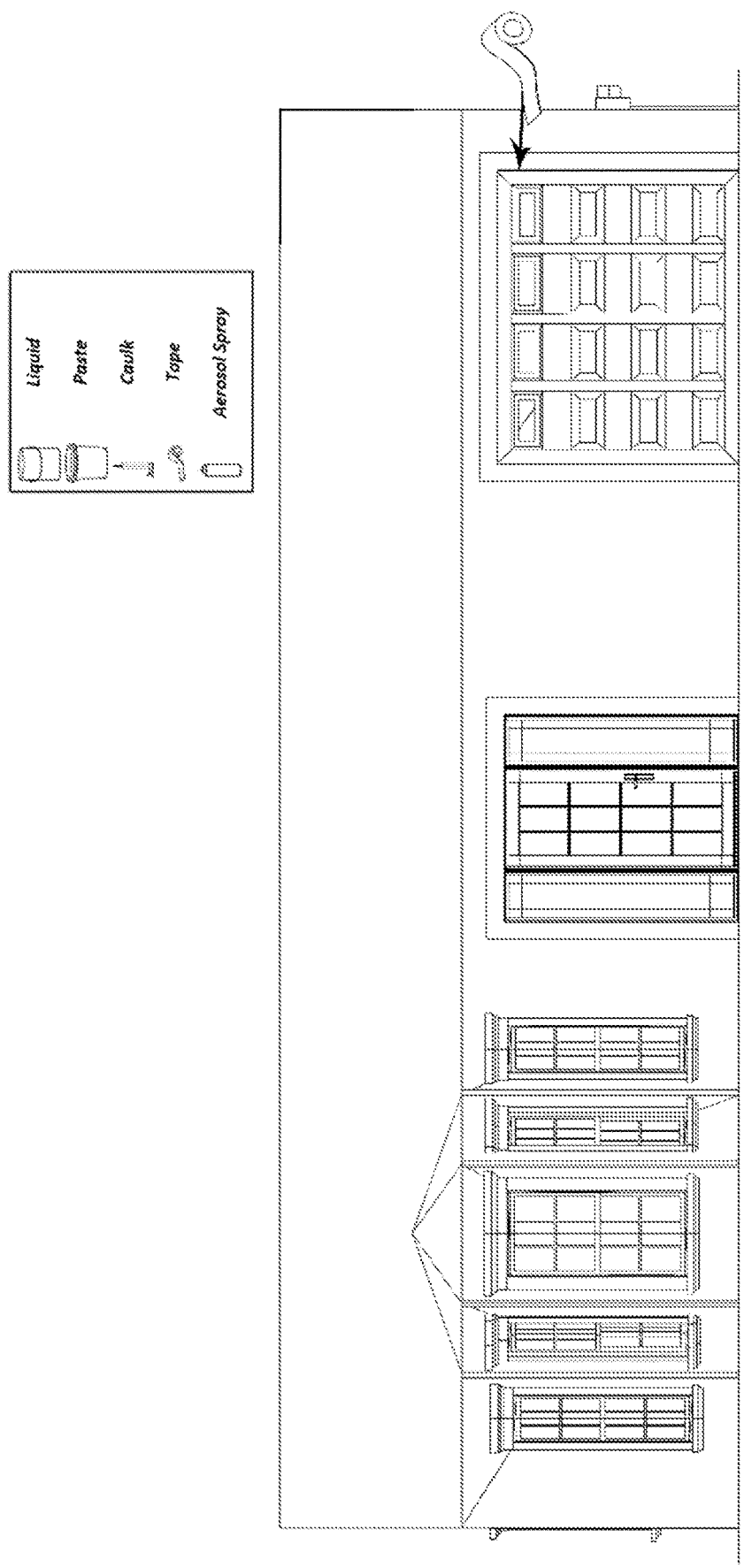
FIG. 9 illustrates application of a removable rubberized tape to waterproof the house of FIG. 7.

FIG. 9 illustrates application of a removable rubberized tape to waterproof the perimeter of a garage door of the example house or other structure shown in FIG. 8. The rubberized tape may be manually applied around the perimeter of a garage door, window frames, screens, head jambs, brickmoulds, stiles, blind stops, interior stops, side jambs, muntins, sills, aprons, stool, inner sash, meeting rails, parting strips, outer sash, rails, interior casings, door seams, shutters, garage doors, garage door seams, or other structures. The removable rubberized liquid, paste, caulk, and aerosolized rubberized liquid-spray compositions may be used to augment the rubberized tape or to fill cracks, seams, or joints around the garage door frame, door frames, window frames, and gaps around the garage door not adequately covered by the rubberized tape. After flooding or after water has receded or the storm ends, the rubberized tape may be removed from the house or other structure.

Figure 10:
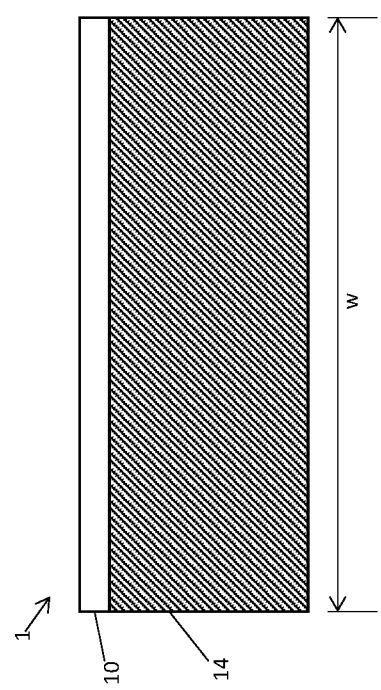
FIG. 10 schematically shows a cross-sectional view of a removable rubberized tape that may be used in various methods disclosed herein.

FIG. 10 schematically shows a cross-sectional view of a removable rubberized tape 1 that may be used in the various methods disclosed herein. The tape 1 may include a relatively thick, rubberized adhesive layer 14 and a backing layer 10. Optionally, a release liner (not shown) is placed over the opposite surface of the adhesive layer 14 to protect the adhesive layer before use. Usually, a release liner is not used, but instead the tape is wound into a roll such that the backing layer 10 covers and protects the adhesive layer 14 until such time that the adhesive layer is exposed by unrolling the tape. In other examples, the backing layer 10 may include a greater thickness than the adhesive layer 14. In some examples, the backing layer 10 may be rubber based. In other examples, the backing layer 10 is non-rubber based. In some examples, the backing layer 10 may be impermeable to water.

The tape may be highly flexible, allowing it to readily conform to the shape of the article to which it is applied. In some examples, the tape may include a capability to stretch or elongate. The adhesive layer is capable of forming a strong bond with a variety of surfaces under a variety of conditions. In some examples, the tape may be applied to a surface that is in contact with water, such as in the case where a storm has already begun. In still other examples, the tape may be applied to a dry surface.

In some examples, a tape is applied to a structure or a portion thereof, or an article for purposes of waterproofing, including providing a temporary, removable waterproof barrier, or modifying an article to make it waterproof by covering preformed holes or by adding a moisture-impermeable layer to the article or a portion thereof. The tape generally may provide a durable, breathable, weatherproof barrier that is resistant to rain, snow, sun, wind, air moisture, UV degradation, and natural weathering over a wide temperature range.

The dimensions of the layers are not particularly limited and may vary widely. The rubberized adhesive layer 14 should have an appropriate thickness to provide the desired adhesive, waterproofing, moisture barrier, insulating, and/or reinforcing properties needed for a particular application. By way of non-limiting example, the thickness of the adhesive layer 14 may range from about 5 to about 50 mils, more often from about 10 to about 40 mils, and typically ranges from about 15 to about 30 mils. The thickness of the backing layer 10 typically is less than that of the adhesive layer. For example, the thickness of the backing layer 10 may range from about 1 to about 20 mils, more usually from about 2 to about 15 mils, and often from about 3 to about 10 mils. In one example, the adhesive layer 14 has a thickness of 21 mils and the backing layer has a thickness of 6 mils.

The overall width w of the tape may be appropriately selected depending on intended applications, and often ranges from about 2 to about 18 inches, more usually from about 4 to about 15 inches, from about 5 to about 13 inches, or from about 6 to about 12 inches. In some examples, a super-wide tape is used, e.g., 12" width, which provides additional strength and waterproofing that enable a much wider range of applications than heretofore were possible, particularly applications needing higher adhesive strength and/or when the tape is applied to a surface in the presence of water, including flowing water. Non-limiting examples of tape widths include 4", 8", and 12". Discrete lengths of the tape (5' or 10', for example) may be wound into rolls for ease of distribution and handling.

The particular type of adhesive used is not limited provided that it has sufficiently high adhesive strength and water resistance characteristics. In some examples, the adhesive layer 14 may be rubber based. In other examples, the adhesive layer 14 is non-rubber based. In some examples, the adhesive layer 14 may be impermeable to water. In some examples, the adhesive layer 14 may include a chemical component to enhance the removability of tape 1. In other examples, the adhesive layer 14 may specifically lack a particular chemical component that surprisingly enhances the removability of tape 1. a chemical component to enhance the removability of the tape 1. In yet other examples, the adhesive is modified to enhance its removable properties to prevent damage to a structure of component upon removal. A number of waterproof adhesives are commercially available. Acrylic adhesives, e.g., cyanoacrylates such as methyl-2-cyanoacrylate and ethyl-2-cyanoacrylate, adhere well to a range of materials such as wood, metal, glass, plastic, and various other surfaces, hold up well to moisture and drastic temperature changes, and generally are resistant to ultraviolet light, solvents, and chemicals. Synthetic rubber adhesives may be based on ethylene propylene diene monomer (EPDM) rubber, ethylene propylene rubber, styrene-butadiene rubber (SBR), rubbers prepared from isoprene (2-methyl-1,3-butadiene), chloroprene (2-chloro-1,3-butadiene), or from isobutylene with a small percentage of isoprene for crosslinking, and polyether-based silane-terminated polymers. In one example, a thermoplastic butyl hybrid adhesive is used. If desired, the rubber layer may be formulated in a variety of colors tailored to particular applications or consumer preferences. For example, rubber compositions may be clear, white, off-white, black, gray, blue, green, red, almond, brown, silver, yellow, terra cotta, or other suitable or desired color. The selection of appropriate pigment(s) or other colorant(s) needed to achieve a desired color will be apparent to persons skilled in the art with the aid of no more than routine experimentation.

The backing layer 10 functions to support the adhesive layer 14 and to provide a non-adhesive surface to the tape 1, e.g., to provide an outer surface of a patch after application over a damaged area. The composition of the backing layer 10 is not particularly limited, but generally should be compatible with the adhesive layer. For example, the backing layer may be constructed from a polyolefin such as polyethylene.

Release liners (when used) may be prepared from suitable materials such as paper, poly-coated paper, polyester film, or polyolefin (e.g., high density polyethylene (HDPE)) film. The release liner may feature a release coating, such as a silicone release coating, to create a low-tack bond with the adhesive layer.

In addition to the applications and benefits as set forth herein, there are benefits in these techniques as demonstrating the uses, the ease of the use, and the advantages of the removable rubber compositions by each of these processes. By making articles and structures waterproof, the techniques described herein further provide benefits associated with avoiding contact with moisture, including making structures waterproof, and making articles rust-resistant, mold-resistant, mildew-resistant, and the like.

To demonstrate the utility and effectiveness of the removable rubberized compositions and tape disclosed herein, a basin, container, water holding enclosure surrounding the building structure, or similar area may be prepared by digging an appropriate area large enough to allow a structure to be positioned within the water holding enclosure. A concrete, metal, or plastic container may also be used as a basin or water holding enclosure. In either case, the area and depth of the basin or container should be large enough to hold enough water to partially cover the structure within the basin or container area. A structure may be placed in the water holding enclosure. Alternatively, a structure may be constructed inside the basin, water holding enclosure surrounding the building structure, or container area. In some examples, the building structure may be a house, a mobile home, a shed, boathouse, a barn, a trailer, etc. In certain examples the house may be constructed without a roof or a portion of a roof to allow visibility for visual monitoring of the interior of the structure by an individual, or with cameras or other monitoring devices. In another example, the house may be constructed with a partial, opened roof to facilitate observation of the inside of the house. In other examples, the structure may be covered and may include cameras or other monitoring devices on the interior of the structure, the exterior of the structure, or in both locations throughout the structure and/or in each room of the structure. The exterior of the structure may then be waterproofed in accordance with the methods disclosed herein. The removable rubber compositions may be applied with a paint roller, trowel, or caulking gun. In some examples, the removable rubber compositions may be applied to the structure from the ground level to about three to four feet above the ground level. In other examples, the removable rubber compositions may be applied to the structure from the base of the foundation to about at least three feet above the ground level and/or foundation. In some examples, the interior of the structure may be waterproofed in accordance with the methods disclosed herein. In still other examples, both the interior and the exterior of the structure may be waterproofed in accordance with the methods disclosed herein. The removable rubber compositions may then be allowed to cure, harden, or solidify.

After waterproofing, the basin, water holding enclosure surrounding the building structure, or container may be filled with enough water to partially or fully cover the structure positioned in the water holding enclosure. Water may be released by various means to flood the water holding enclosure such as by flooding with fire hoses and trucks, hoses attached to fire hydrants or fire engines, or by water trucks or prepositioned containers filled with water and transported by truck or attached to a truck. An individual may also be prepositioned inside the building structure prior to water release to monitor the release of water and to verify no water has leaked into the building structure. In other examples, the building structure may include devices to generate lightening and to generate simulated rain showers. In some examples the devices may be positioned around the exterior of the building structure. The structure may be monitored or inspected to confirm no water or a minimal amount of water has penetrated the structure. The water may remain in the water holding enclosure or container for at least, greater than, less than, equal to, or any number in between about 1, 2, 3, 4, 5, 10, 15, 20, 25, 30, 35, 40, 45, 50, 55, 60, 65, 70, 75, 80, 85, 90, 95, 100, 105, 110, 115, and 120 minutes. In other examples the water may remain in the water holding enclosure surrounding the building structure or container for at least, greater than, less than, equal to, or any number in between about 0.5, 1, 2, 3, 4, 5, 6, 7, 8, 9, 10, 11, 12, 13, 14, 15, 16, 17, 18, 19, 20, 21, 22, 23, 24, 36, and 72 hours. In still other examples, the water may remain in the water holding enclosure surrounding the building structure or container for at least, greater than, less than, equal to, or any number in between about 0.5, 1, 2, 3, 4, 5, 6, 7, 8, 9, 10, 11, 12, 13, and 14 days. In another example, the water may be drained from the water holding enclosure surrounding the building structure or container. The water may drain into a natural pond or lake positioned near the building structure and at a lower grade to facilitate drainage. The rubberized compositions and tape used to waterproof the structure may then be removed from the structure and the interior and exterior of the structure may be visually or remotely inspected for water penetration.

The foregoing description should be considered illustrative rather than limiting. It should be recognized that various modifications can be made without departing from the spirit or scope of the invention as described and claimed herein.

What is claimed is:

1. A method of waterproofing a building structure, the method comprising:
   providing a building structure;
   providing a water holding enclosure, wherein the water holding enclosure surrounds the building structure and wherein the water holding enclosure is configured to hold at least 3 feet of water against the building structure;
   applying a removable composition onto the building structure or a portion thereof to create a temporary, watertight seal wherein the removable composition is selected from the group consisting of a sprayable aerosol-based liquid, a viscous liquid, an injectable caulk, and an adhesive tape;
   filling the water holding enclosure with water wherein the water partially covers the building structure;
   verifying that an interior of the building structure is watertight;
   draining the water from the water holding enclosure; and
   removing the composition from the building structure.

2. The method of claim 1, further comprising applying a malleable paste onto the building structure or a portion thereof.

3. The method of claim 2, wherein the removable composition is a sprayable aerosol-based rubberized liquid, a viscous liquid rubber, an injectable rubber caulk, or a rubberized adhesive tape.

4. The method of claim 1, wherein the removable composition comprises a color, and wherein the color is white, black, gray, blue, green, red, brown, silver, or yellow.

5. The method of claim 1, wherein the removable composition is clear.

6. The method of claim 1, wherein the building structure includes cameras on an interior of the building structure.

7. The method of claim 1, wherein the building structure is monitored to confirm no water or a minimal amount of water has penetrated the building structure.

8. A method of waterproofing a building structure, the method comprising:
applying a removable composition onto a building structure or a portion thereof to create a temporary, watertight seal, wherein the building structure is positioned within a water holding enclosure surrounding the building structure, and wherein the building structure is selected from the group consisting of a house, a house without a roof, a mobile home, and a trailer;
filling the water holding enclosure with water, wherein a portion of the building structure is covered with the water;
draining the water from the water holding enclosure;
removing the composition from the building structure without damaging the building structure; and
verifying that the water did not penetrate the building structure.

9. The method of claim 8, wherein the removable composition is selected from the group consisting of a sprayable aerosol-based liquid, a viscous liquid, a thick malleable paste, an injectable caulk, an adhesive tape, and combinations thereof.

10. The method of claim 8, wherein the removable composition is a sprayable aerosol-based rubberized liquid, a viscous liquid rubber, an injectable rubber caulk, or a rubberized adhesive tape.

11. The method of claim 8, wherein the removable composition comprises a color, and wherein the color is white, black, gray, blue, green, red, brown, silver, or yellow.

12. The method of claim 8, wherein the removable composition is clear.

13. The method of claim 8, wherein the building structure includes cameras on an interior of the building structure.

14. The method of claim 8, wherein the building structure is monitored to confirm no water or a minimal amount of water has penetrated the building structure.

15. A method of storm-proofing a house, the method comprising:
applying a removable composition onto the house or a portion thereof to create a temporary, watertight seal,
wherein the removable composition is selected from the group consisting of a sprayable aerosol-based liquid, a viscous liquid, a malleable paste, an injectable caulk, an adhesive tape, and combinations thereof,
wherein the removable composition is applied from a ground level of the house to a height of at least 3 feet above the ground level,
wherein the house comprises at least one door, a garage door, a plurality of windows, and wherein the house lacks a roof,
wherein every seam of the at least one door, the garage door, and the plurality of windows is sealed with the removable composition,
wherein the house is positioned within a water holding enclosure surrounding the house, and
wherein strips of the adhesive tape are applied end to end such that small gaps are formed between the strips of the adhesive tape;
filling the small gaps formed between the strips of the adhesive tape with one or more of the sprayable aerosol-based liquid, the viscous liquid, the injectable caulk, or the malleable paste;
flooding the water holding enclosure with water,
wherein a portion of the house is covered with the water;
draining the water from the water holding enclosure; and
removing the composition from the house without damaging the house.

16. The method of claim 15, wherein the removable composition is a sprayable aerosol-based rubberized liquid, a viscous liquid rubber, an injectable rubber caulk, or a rubberized adhesive tape.

17. The method of claim 15, wherein the removable composition comprises a color, and wherein the color is white, black, gray, blue, green, red, brown, silver, or yellow.

18. The method of claim 15, wherein the removable composition is clear.

19. The method of claim 15, wherein the house includes cameras on an interior of the house.

20. The method of claim 15, wherein the house is monitored to confirm no water or a minimal amount of water has penetrated the house.

* * * * *